April 21, 1953 — C. J. WOOD — 2,635,307
MAT
Filed Aug. 1, 1950
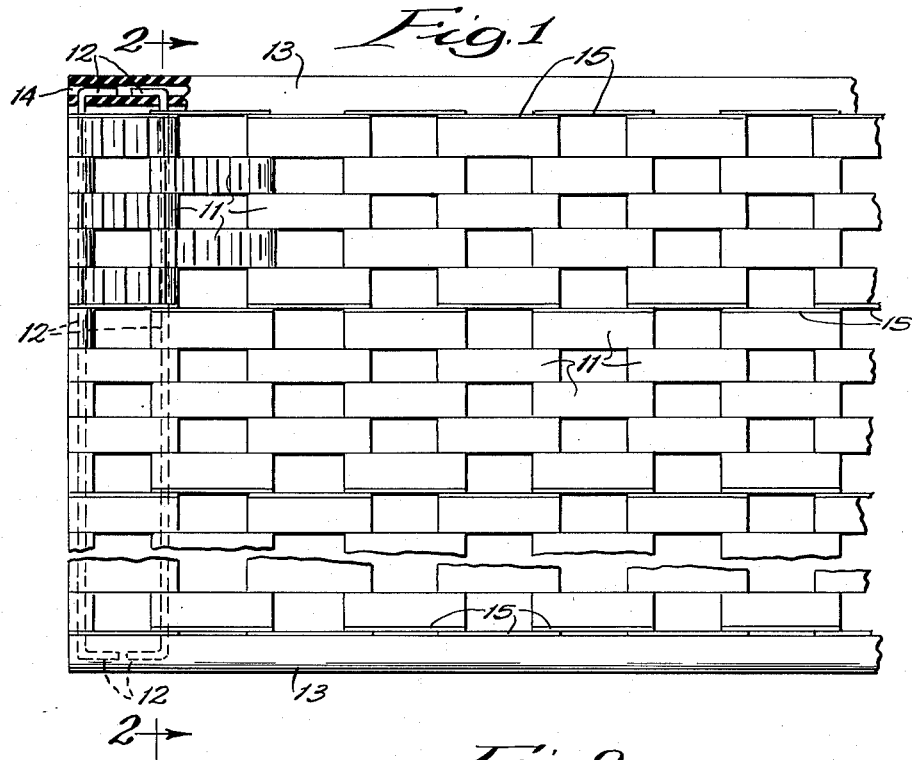
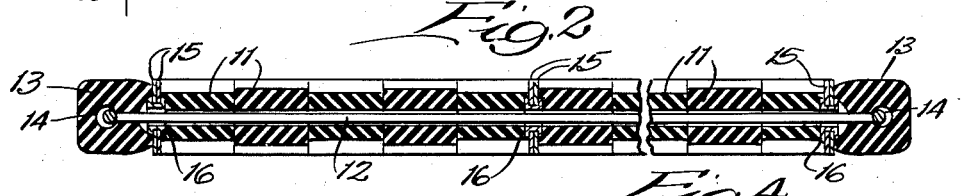
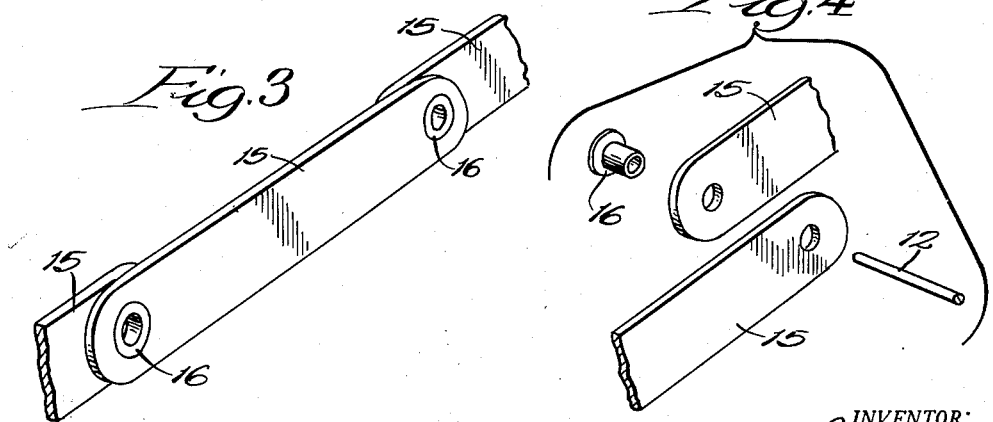
INVENTOR:
Charles J. Wood,
BY
Dawson & Orms
ATTORNEYS.

Patented Apr. 21, 1953

2,635,307

UNITED STATES PATENT OFFICE 2,635,307

MAT

Charles J. Wood, Evergreen Park, Ill., assignor to Superior Rubber Mfg. Co., Chicago, Ill., a corporation of Illinois Application August 1, 1950, Serial No. 177,009

3 Claims. (Cl. 20—78.3)

This invention relates to mats; in particular, it concerns a mat of improved design particularly adapted for use in long sections as a floor mat for corridors, vestibules, etc.

Mats of the type here under consideration are customarily made of rubber, although they may be fashioned from any plastic material having physical properties similar to those of rubber.

The particular problem to the solution of which this invention is directed is the problem of providing a safe, satisfactory floor mat for use in long sections, wherein the length of a continuous mat may be 100 feet, 200 feet, or more.

Frequently a need for such mats is encountered in large factory buildings, public office buildings, vestibules of churches, theaters, places of public assembly, and other locations wherein people walk in large numbers and where there is accordingly necessity for providing secure footing.

Experience has proved that the most satisfactory type of mat, from the points of view of long life, safe footing, and over-all economy, is the link type which is made up of a very large number of small rubber links suitably assembled in an interlaced arrangement. Such mats cling tenaciously to floors even when wet, and can be readily rolled up for storage or to facilitate cleaning of the floor beneath. In units of modest length, the prior-art mats were found quite highly satisfactory. It was early found, however, that when the extension of such mats to lengths of 100 feet or more was attempted, they became, rather than safety devices, a substantial source of danger in themselves. This resulted from the fact that in such great length the mat became subject to stretching and thus changing its length by as much as several inches or a foot. The total "give" in any one set of rubber links was slight, but when, in a long mat, the total of all the individual link yields was cumulated, it often reached an amount great enough to cause serious danger, since, as persons walked over the mat, it would stretch and pile up in front of the walker's feet, thus presenting him with an obstruction over which he could easily stumble and fall.

In the prior art, an attempt has been made to cure this stretching tendency in rubber mats by reinforcing the rubber links at intervals with metal links. Mats so constructed have not been entirely satisfactory, however, since the "play" of the individual links around the axle rods, while slight with respect to individual pairs of links, would total several inches in 100 feet. To the extent of such "play," the mats were still free to stretch, and thus the metal-reinforced mats were nearly as dangerous as the older, reinforced ones.

In this invention, I have provided a simple, inexpensive, and remarkably effective means for reinforcing a rubber mat with metal links in a manner which reduces the stretch of a small fraction of one inch in a hundred feet. As a result, by employing this novel technique, I have been able to provide rubber mats up to several hundred feet in length which provided perfectly safe footing, entirely free from any tendency to stretch and pile up in front of the walker's feet.

It may accordingly be stated that one of the objects of my invention is to provide a floor mat, of rubber or other resilient material, having pliability and at the same time being free from any appreciable tendency to stretch in the longitudinal direction.

Another object of my invention is to provide a link-type floor mat formed of rubber, or other resilient material, reinforced with metal links effectively constructed to prevent stretching of the mat in the longitudinal direction.

Still another object of my invention is to provide a simple and inexpensive means for locking the metal reinforcing links in a rubber mat together to secure the mat against stretching in the longitudinal direction while leaving the mat flexible for being rolled up and leaving it also resilient under foot.

Other objects and advantages of my invention will appear as the specification proceeds.

In the accompanying drawing, I have shown several views of an illustrative embodiment of my invention. In the drawing, Figure 1 is a plan view, partly in section, showing a narrow segment of mat made according to my invention; Fig. 2 is a transverse sectional view taken along the line 2—2 of Fig. 1; Fig. 3 is a fragmentary perspective view showing portions of three metal reinforcing links as they appear ready for assembly into a mat embodying my invention; and Fig. 4 is an exploded perspective view showing two of my metal reinforcing links, together with their associated parts.

As may be noted from Fig. 1, the illustrative mat there shown is made up of a large number of rubber links, of which illustrative ones are denoted 11. Links 11 are conventional in character, consisting, in the usual case, of rubber blocks about 1¾" long and about ½" in width. Each link is provided with a transverse hole at each end, to receive the axle rods which bind the links together. In addition, in the usual case, the upper and lower surfaces of the links are serrated, as shown in Figs. 1 and 2. These serrations assist in causing the mat to cling to the floor and in providing secure footing for persons walking over the mat. The precise conformation of the rubber links is no part of my invention, and it will be understood that my illustration of the conventional links shown is purely exemplary.

The mat is made up of a large number of links 11 interlaced together in rows as shown. Each pair of links in a given row is separated by the leading end of a link in the next row and by the trailing end of a link in the row next preceding.

The various rows of links are held together and are secured to their neighboring rows by transverse axle rods 12. These rods, which are normally made of heavy steel wire, terminate at the edges of the mat in rubber edging strips 13. Each of the edging strips 13 contains a central aperture 14 equipped with a large number of branch apertures spaced along the edge of the edging strip 13 destined to adjoin the links. The axle rods 12 pass through the spaced apertures and, being bent at right angles, are received within the aperture 14 of edging strip 13.

As may be noted from Fig. 1, a strip of metal links 15 is provided adjacent each edging strip 13 and also at spaced intervals across the width of the mat. In practice, it has been found that a column of metal reinforcing links is desirable every fifth or sixth column of rubber links.

It will be understood, of course, that an actual rubber mat will normally be much wider, in proportion to the width of the individual links, than is shown in the drawing; this is indicated by the broken zone in the figure near its lower edge.

As may be seen in Fig. 2, the transverse axle rods 12 pass through the apertures in the rubber links 11 and also through the apertures provided at the junction of each pair of metal links 15. The structure of these junctions is an important part of my invention, and I shall describe it in detail in the following paragraphs.

As may be noted from Fig. 3, my metal reinforcing links form a continuous, integrated chain, rather than being individual links assembled with the rubber links and held together by the axle rods, as was the case of prior-art structures. Each pair of metal links in one of my reinforcing chains is secured together by a hollow rivet 16, such hollow rivet having a central aperture large enough to receive readily the axle rod 12. The metal links are provided with apertures at each end, and the rivets 16 are inserted therethrough as shown in Figs. 3 and 4 to provide continuous chains of any desired length. The apertures in my links 15 are stamped to receive snugly the shanks of rivets 16, and the swaging action of the riveter which flattens out the tip of rivets 16 on assembly has also some effect in enlarging the shank of the rivets and thus providing a very snug, tight union between the adjacent links 15.

As will be obvious from examination of Fig. 3, links 15, with rivets 16, can be made up into chains of any desired length; in actual mats made according to this invention, such chains have been made to a length of many feet.

The assembly, therefore, of my mat involves interlacing the rubber links as aforesaid, placing one of my chains of metal links at intervals across the mat, the desirable interval being every five or six rows of rubber links.

It will be understood, of course, that any degree of reinforcement with one of my snugly joined linking chains is extremely helpful in reducing the tendency of the mat to stretch in the longitudinal direction; and, should it be desired, for economy or other reasons, one, two, or other desired number of my reinforcing chains can be employed. In some cases, it may suffice to place one of my reinforcing chains in the middle of a narrow mat. In other cases, it may be considered sufficient to place reinforcing chains along the edges only. I prefer, however, in the interest of greatest safety and freedom from stretching tendency, to space the reinforcing chains every five or six rows of links, as mentioned in the preceding paragraph.

A mat made according to my invention is almost completely free from tendency to stretch, and the rubber links themselves are at no time placed under longitudinal tension. Longitudinal stresses embodied on the mat are taken entirely by links 15 and rivets 16, the rubber links 11 and the transverse axle rods 12 being at all times protected against stresses along the length of the mat. This protects the rubber links from being torn out at the ends, and insures against bumps and other irregularities in the surface of the mat occasioned by stresses on axle rods 12.

While I have in this specification described in considerable detail a single embodiment of my invention, it will be understood that numerous variations therein may be made by persons skilled in the art without departing from the spirit of my invention. It is accordingly my desire that the embodiment described be regarded as illustrative only, and that the scope of my invention be measured primarily by reference to the appended claims.

I claim:

1. A floor mat comprising a plurality of resilient links arranged in interlaced rows and having apertures near their ends arranged for registration with the apertures in neighboring links, transversely oriented rods passed through said registered apertures for holding the mat structure together in interlaced position, and a metal-reinforcing member for said mat comprising a chain of flat metal links snugly joined together one to another seriatim with hollow rivets, said hollow rivets providing apertures to receive said transverse rods and said chain being thereby carried on said transverse rods.

2. Apparatus according to claim 1 having a plurality of such metal-reinforcing members longitudinally interlaced in said mat at spaced intervals across the width thereof.

3. A floor mat comprising a plurality of resilient links arranged in interlaced rows and having apertures near their ends arranged for registration with the apertures in neighboring links, transversely oriented rods passing through said registered apertures and holding the mat structure together in interlaced position, and a reinforcing member for said mat comprising a chain formed of links having a relatively high tensile strength, said links having an aperture adjacent each end in register with said transverse rods and being joined one to another by hollow rivets snugly received within the apertures but permitting pivotal movement of the links about the rivets, said hollow rivets providing apertures therethrough to receive said transverse rods and said chain being thereby carried on said transverse rods.

CHARLES J. WOOD.

References Cited in the file of this patent

UNITED STATES PATENTS

| Number | Name | Date |
| --- | --- | --- |
| 746,722 | Mahler | Dec. 15, 1903 |
| 1,490,296 | Swanson | Apr. 15, 1924 |
| 2,202,636 | McClelland | May 28, 1940 |
| 2,571,337 | Burnham | Oct. 16, 1951 |